July 8, 1952  R. C. BAKER ET AL  2,602,515
CASING SCRAPER
Filed March 1, 1948
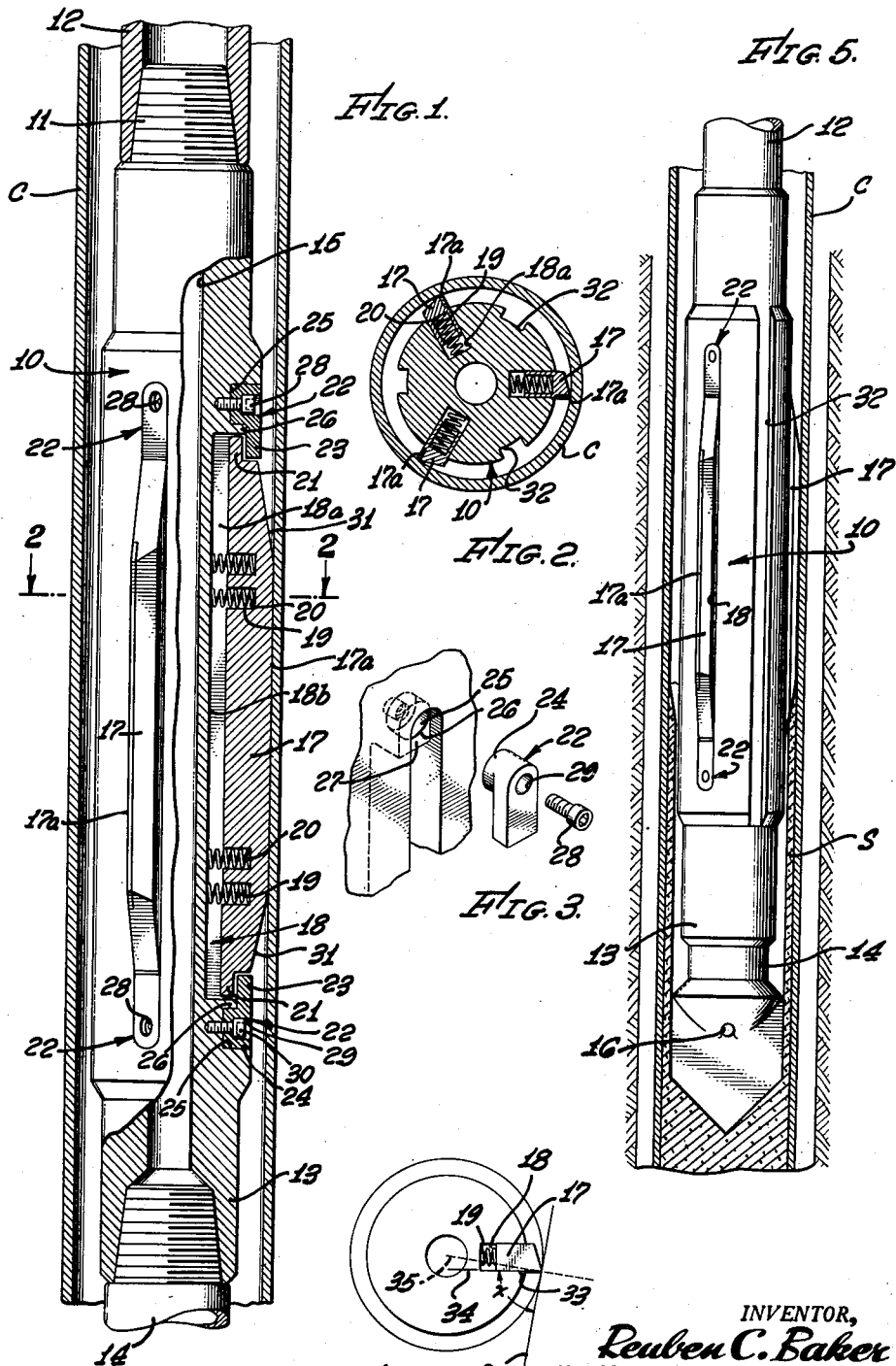
INVENTOR,
Reuben C. Baker
William S. Althouse, Jr.
BY Oscar A. Mellin
ATTORNEY Patented July 8, 1952

2,602,515

UNITED STATES PATENT OFFICE 2,602,515

CASING SCRAPER

Reuben C. Baker, Coalinga, and William S. Althouse, Jr., Arcadia, Calif., assignors to Baker Oil Tools, Inc., Vernon, Calif., a corporation of California Application March 1, 1948, Serial No. 12,264

7 Claims. (Cl. 166—18)

The present invention relates to devices for cleaning the inner walls of well casings or liners, and more particularly to a rotatable casing scraper capable of scraping a film of cement, or other scaly material, from the inner wall of such casing string or liner. The casing scraper is also capable of removing internal gunshot burrs from the inside of casing, which are normally formed by the shooting of bullets through the casing in a gun perforating operation, and of dislodging any bullets that might not have passed through the casing, but, instead, project partly into the casing interior.

A casing scraper of the character indicated is disclosed in the patent to R. C. Baker, 2,275,939, patented March 10, 1942. The device illustrated in the patent employs a plurality of springs for urging longitudinally extending scraper blades against the internal wall of the casing or liner. Outward movement of the blades is limited by stop devices fitting within grooves in the body that are so shaped and arranged as to reduce the cross-sectional area of the body considerably, thereby diminishing its strength to a corresponding degree.

It is, accordingly, an object of the present invention to provide a casing scraper, or similar tool, in which outward blade movement is limited by stop devices that do not materially decrease the cross-sectional area of the body. Nevertheless, the stop devices are stronger and sturdier than those heretofore used.

Another object of the invention is to provide stops for retaining cutting blades properly mounted in the body of a casing scraper, which are more firmly secured to the body, and which offer a greater holding force resisting outward movement of the blades beyond the limits imposed by the stops themselves.

Still another object of the invention is to provide stops for retaining cutter blades properly mounted in the body of a casing scraper, which cannot be tilted by the blades from their assembled positions on the body.

As disclosed in the aforesaid patent, the cutting edges of the scraper blades are radial of the tool body and casing or liner being cleaned. Although this provides a very efficient cutting arrangement, the blades are susceptible to chattering when in use, and may dig into the wall of the casing liner. In addition, the radial disposition of the forward cutter edges decreases the backing area supplied by the tool body for each blade and also limits the thickness of the blade that can be used, as a practical matter.

Yet another object of the invention is to obviate the foregoing disadvantages by providing a cutter blade and body arrangement which ensures an increased blade life, reduces the tendency toward blade chattering and digging of the blade into the work, and allows the use of thicker blades, capable of bearing against a greater area on the main body of the scraper.

The invention has other objects that will become apparent from a consideration of the embodiment shown in the drawings accompanying and forming part of the present specification. This form will now be described in detail, but it is to be understood that such detailed description is not to be taken in a limiting sense, since the scope of the invention is best defined by the claims appended hereto.

Referring to the drawings:

Figure 1 is a side elevation of a casing scraper in a well casing, with parts shown in longitudinal section;

Fig. 2 is a transverse section taken along the line 2—2 on Fig. 1;

Fig. 3 is an exploded, isometric view of one of the blade-retaining segments, illustrating its cooperation with a portion of the body;

Fig. 4 is a diagrammatic view of the disposition of a cutter and groove with respect to the casing; and Fig. 5 is a longitudinal section through a well casing and bore hole disclosing the casing scraper in use.

The casing scraper disclosed in the drawings includes an elongate main body 10 having an upper threaded pin 11 for attachment to the lower end of a drill collar 12, or other pipe joint forming the lower end of a drilling string running to the top of the well bore. The other end of the body may be constituted by a threaded box 13, which may be secured on the pin end of a drill bit 14. Circulating fluid pumped down the drilling string 12 may pass through the central passageway 15 through the body and into the drill bit 14 for discharge from the circulation holes or nozzles 16 in the latter. The circulating fluid then flows upwardly around the tool to flush the cuttings to the top of the well bore.

The casing scraper is adapted for particular use in a well casing or liner C, being expressly designed for scraping the inner wall of the casing or liner, to clean it of a sheath of cement, gunshot burrs, bullets, and the like, and thereby ensure a full internal casing diameter through which other sub-surface well equipment may pass freely.

The scraping action is performed by a plurality of longitudinally extending scraper blades 17, which are slidably mounted for transverse movement within generally equi-angularly disposed longitudinally extending grooves 18 in the body 10. The blades 17 are guided in their movement in the grooves by the side walls 18a of the latter. Each blade is normally urged outwardly against the casing C by a plurality of coil springs 19 received within sockets or pockets 20 in the blades and bearing against the base 18b of the groove. The number of springs used behind each blade and the force exerted by each spring may be varied, in accordance with the cutting force with which it is desired to engage the longitudinally extending cutting edges 17a of the blade with the inner wall of the casing C, or with any material or substance that might coat the wall of the casing.

In order to limit the extent of outward movement of each blade 17 with respect to the body 10, the upper and lower blade terminals 21 are engageable with stop segments 22 secured to the body at opposite ends of the longitudinal groove 18. The blade terminals are engageable with the finger portions 23 of the stop segments, which are disposed over the ends of each groove 18.

Each stop segment 22 includes a generally cylindrical body 24 adapted to fit snugly into a cylindrical socket 25 in the tool body 10, disposed substantially in alignment with the longitudinal body groove 18. The socket is separated from the groove by a wall portion or partition 26, which provides substantially full bearing contact between the wall of the socket 25 and the exterior of the cylindrical body portion 24 of the segment. The wall 26 does not extend outwardly to the full extent of the body 10 to allow the segment finger 23 to project across the wall 26 and across the end of the groove 18. In effect, a channel or shallow groove 27 is formed between the socket 25 and the longitudinal groove 18, whose side walls confine the finger 23 and prevent rotation of the segment 22 within the cylindrical socket 25. The segment is prevented from outward movement from its socket by a screw 28 extending into a hole 29 in the segment and threaded into the body. The head 30 of the screw engages the cylindrical segment body 24 to prevent outward movement of the segment.

It is to be noted that the segment 22 and screw 28 are so disposed on the body 10 as to lie substantially entirely within its peripheral confines.

When the tool is assembled, the springs 19 behind each blade urge the latter outwardly to an extent determined by engagement of their terminal portions 21 with the stop segments 22. The tool may be secured on the lower end of a drill string 12 and, as shown in the drawings, may be attached to a drill bit 14, assuming that the device is to be used for scraping a cement sheath from the casing wall. As the tool is lowered in the casing, the lower tapered ends 31 of the blades engage the upper end of the casing C and compress the blades 17 inwardly against their compression springs 19, the springs then exerting an outward force on the blades holding their cutting edges 17a in firm engagement with the casing wall or cement sheath.

When the region in the casing is reached at which the cement is to be removed, the drill string 12 is rotated, as to the right, causing the drill bit 14 to disintegrate the cement in the casing. In view of the normal running clearance with the casing that such bits have, they allow a thin sheath of cement S to adhere to the wall of the casing, which is scraped or cut away by the spring pressed scraper blades 17 mounted on the body 10. Drilling proceeds until all of the cement in the casing string has been removed and the walls scraped clean by the scraper blades 17.

In the event that bullet holes have been shot through the casing, the scraper blades would also cut the burrs which such bullets leave from the interior of the casing. Moreover, should any bullets project into the casing wall, the blades 17 will break them loose from the casing C and allow them to be removed in the circulation fluid to the top of the well bore. For the purpose of facilitating upward flow of relatively large particles, like bullets, longitudinal circulation grooves 32 may be formed in the casing scraper body 10 between the blade grooves 18. Such circulation grooves 32 allow ample area between their bases and the casing wall for the upward passage of fairly large particles of material. Of course, such grooves also offer a path of relatively large area through which the cement cuttings and other materials can pass.

It is to be noted that each socket 25 for a stop segment 22 is no wider than the width of the cutter groove 18. As a result, the cross-sectional area of the body through the region of the socket 25 is diminished to only a slight extent. As a matter of fact, such area is greater than the cross-sectional body area through the cutter grooves 18 themselves. Accordingly, the cross-sectional area of the body remains substantially at its full maximum value in the region of the retainer segments 22, which greatly strengthens the body of the casing.

The fitting of the cylindrical body portions 24 of the stop segments within the cylindrical sockets 25 also affords a much greater resistance to outward movement of the scraper blades 18 under the influence of the springs 19. Such outward moving tendency forces each blade terminal 21 against the finger 23 and tends to tilt the finger outwardly. This tilting tendency, however, is resisted by the wall of the cylindrical socket 25. It will be apparent from an inspection of Fig. 1, for example, that the outward tilting tendency on an upper segment 22 is resisted by engagement of the lower surface of the cylindrical body 24 with the upper end of the cylindrical socket 25. The only way for the retainer segment to be removed is through a direct straight line, outward pull on the segment 22, which is firmly resisted by the screw 28 threaded into the body 10. Of course, when the segment 22 is removed, it is a simple matter to remove the screw 28 and allow the segment to be dismantled from the cylindrical socket 25.

The central plane of each cutter blade groove 18 is substantially radial of the scraper body 10, which places the longitudinal forward cutting surface 33 of each blade 17 in advance of the central plane. The forward cutting surface 33 of each blade is disclosed as lying in a plane parallel to the central radial plane, which provides a negative rake on the blade 17 with respect to the casing or work C. By reference to Fig. 4, it will be noted that the forward cutter portion 33 of the blade lies in a plane 34 in advance of a radial line or plane 35 extending from the axis of the body 10 or casing C to the line of contact of the cutter blade 17a with the work. That is to say, the forward side 33 of the cutter lies in a plane 34, making an angle of less than ninety degrees with a plane 36 tangent to the casing at its point of contact with the cutter blade.

The provision of the negative rake described above on each blade increases its life by affording less opportunity for the cutting edge 17a to dig into the casing or work C, and also by reducing the tendency of the blade to chatter, especially in view of its being urged outwardly by springs 19. The blade edge 17a pressed to the work is also much stronger and will resist chipping upon operating on gunshot burrs or bullets on the inner wall of the well casing.

The disposition of the cutter grooves 18 with their central plane essentially radial has still further advantages, since it provides a greater body area at the trailing side 18a of the groove backing the blade 17, affording a much sturdier blade and body combination. In addition, it allows each blade to be made thicker by increasing the width of the groove 18. The width of the groove 18 may be made greater than ever, before the backing area provided by the drilling body surface 18a of the groove is materially reduced.

There is yet a further advantage to a radial disposition of the grooves 18 and the negative rake provided on the blades 17. The placing of the grooves 18 in the radial position allows the aligned, cylindrical sockets 25 to be formed through a radial portion of the body 10, where it has its thickest section. As a result, the cylindrical socket 25 and companion segment body 24 may be made deeper without substantially weakening the body, all of which contributes to the provision of a much better stop arrangement.

The inventors claim:

1. A rotary casing scraper: including a body adapted for attachment to a drilling string, said body having a longitudinal groove in its exterior; a cutter blade slidably mounted in said groove; means for moving said blade outwardly of said body; stop means comprising a segment having a body portion and a projecting portion extending laterally from said body portion and engageable with said blade to limit outward movement of said blade, said scraper body having a transversely extending socket in the exterior of the scraper body of substantially the same shape and size as said body portion so that the wall of said socket surrounds the entire periphery of said body portion to snugly receive said body portion, and means for securing said body portion to said body and within said socket.

2. A rotary casing scraper: including a body adapted for attachment to a drilling string, said body having a longitudinal groove in its exterior; a cutter blade slidably mounted in said groove; means for moving said blade outwardly of said body; stop means comprising a segment having a cylindrical body portion and a projecting portion extending laterally from said body portion and engageable with said blade to limit outward movement of said blade, said scraper body having a transversely extending cylindrical socket in the exterior of the scraper body of substantially the same size as said cylindrical body portion so that the cylindrical wall of said socket surrounds the entire periphery of said cylindrical body portion to snugly receive said cylindrical body portion; and means for securing said cylindrical body portion to said body and within said cylindrical socket.

3. A rotary casing scraper: including a body adapted for attachment to a drilling string, said body having a longitudinal groove in its exterior; a cutter blade slidably mounted in said groove; means for moving said blade outwardly of said body; stop means comprising a segment having a body portion and a projecting portion extending laterally from said body portion and engageable with said blade to limit outward movement of said blade, said scraper body having a transversely extending socket in the exterior of the scraper body of substantially the same shape and size as said body portion so that the wall of said socket surrounds the entire periphery of said body portion to snugly receive said body portion, said scraper body also having a channel extending between said groove and socket and receiving said projecting portion, and means for securing said body portion to said body and within said socket.

4. A rotary casing scraper: including a body adapted for attachment to a drilling string, said body having a longitudinal groove in its exterior; a cutter blade slidably mounted in said groove; means for moving said blade outwardly of said body; stop means comprising a segment having a cylindrical body portion and a projecting portion extending laterally from said body portion and engageable with said blade to limit outward movement of said blade, said scraper body having a transversely extending cylindrical socket in the exterior of the scraper body of substantially the same size as said cylindrical body portion so that the cylindrical wall of said socket surrounds the entire periphery of said cylindrical body portion to snugly receive said cylindrical body portion, said scraper body also having a channel extending between said socket and groove and in which said projecting portion is received, and means for securing said cylindrical body portion to said body and within said cylindrical socket.

5. A rotary casing scraper: including a body adapted for attachment to a drilling string, said body having a plurality of circumferentially spaced longitudinal grooves in its exterior; a cutter blade slidably mounted in each of said grooves; means for moving said blades outwardly of said body; stop means disposed at opposite ends of each groove, each of said stop means comprising a segment having a body portion and a projecting portion extending laterally from said body portion and engageable with an end of each blade to limit outward movement of said blade, said scraper body having a transversely extending socket in the exterior of the scraper body of substantially the same shape and size as said body portion so that the wall of said socket surrounds the entire periphery of said body portion to snugly receive said body portion, and means for securing said body portion to said body and within said socket.

6. A rotary casing scraper: including a body adapted for attachment to a drilling string, said body having a groove in its exterior; a cutter blade slidably mounted in said groove; means for moving said blade outwardly of said body; stop means comprising a segment having a body portion and a projecting portion extending laterally from said body portion and engageable with said blade to limit outward movement of said blade, said scraper body having a transversely extending socket in the exterior of the scraper body of substantially the same shape and size as said body portion so that the wall of said socket surrounds the entire periphery of said body portion to snugly receive said body portion, and means for securing said body portion to said body and within said socket.

7. A casing scraper: including a body adapted for attachment to a drilling string, said body having a groove in its exterior; a cutter blade slidably mounted in said groove; means for moving said blade outwardly of said body; stop means comprising a segment having a cylindrical body portion and a projecting portion extending laterally from said body portion and engageable with said blade to limit outward movement of said blade, said scraper body having a transversely extending cylindrical socket in the exterior of the scraper body of substantially the same size as said cylindrical body portion so that the cylindrical wall of said socket surrounds the entire periphery of said cylindrical body portion to snugly receive said cylindrical body portion; and means for securing said cylindrical body portion to said body and within said cylindrical socket.

REUBEN C. BAKER.
WILLIAM S. ALTHOUSE, Jr.

REFERENCES CITED

The following references are of record in the file of this patent:

UNITED STATES PATENTS

| Number | Name | Date |
| --- | --- | --- |
| 1,848,404 | Abegg | Mar. 8, 1932 |
| 2,061,057 | Bigler | Nov. 17, 1936 |
| 2,275,939 | Baker | Mar. 10, 1942 |
| 2,438,673 | McMahan | Mar. 30, 1948 |